(12) United States Patent
Wang et al.

(10) Patent No.: US 7,693,220 B2
(45) Date of Patent: Apr. 6, 2010

(54) TRANSMISSION OF VIDEO INFORMATION

(75) Inventors: Ru-Shang Wang, Coppell, TX (US);
Ragip Kurceren, Carollton, TX (US);
Viktor Varsa, Irving, TX (US); Keith Miller, Plano, TX (US)

(73) Assignee: Nokia Corporation, Espoo (FI)

( * ) Notice: Subject to any disclaimer, the term of this patent is extended or adjusted under 35 U.S.C. 154(b) by 1793 days.

(21) Appl. No.: 10/785,426

(22) Filed: Feb. 23, 2004

(65) Prior Publication Data

US 2004/0218673 A1 Nov. 4, 2004

Related U.S. Application Data

(63) Continuation-in-part of application No. 10/250,838, filed as application No. PCT/FI02/00004 on Jan. 3, 2002.

(51) Int. Cl.
*H04B 1/66* (2006.01)
*H04N 7/12* (2006.01)
*H04N 11/02* (2006.01)

(52) U.S. Cl. .............................. 375/240.2; 375/240.12

(58) Field of Classification Search .............. 375/240.2, 375/240.12
See application file for complete search history.

(56) References Cited

U.S. PATENT DOCUMENTS

| | | | |
|---|---|---|---|
| 5,386,234 A | | 1/1995 | Veltman et al. |
| 5,903,310 A | | 5/1999 | Finotello et al. |
| 6,002,440 A | * | 12/1999 | Dalby et al. ............ 375/240.12 |
| 6,012,091 A | | 1/2000 | Boyce |
| 6,137,834 A | | 10/2000 | Wine et al. |
| 6,160,844 A | * | 12/2000 | Wilkinson ................... 375/240 |
| 6,163,575 A | | 12/2000 | Nieweglowski et al. |
| 6,175,595 B1 | | 1/2001 | Keesman |
| 6,192,078 B1 | | 2/2001 | Komiya et al. |

(Continued)

FOREIGN PATENT DOCUMENTS

CA 2 274 181 6/1998

(Continued)

OTHER PUBLICATIONS

Patent Abstract, publication No. JP02078584A2, "Printing Control Method and Device Therefor", Tsukada Masayuki et al.

(Continued)

*Primary Examiner*—Tung Vo
*Assistant Examiner*—Anner Holder

(57) ABSTRACT

The present invention relates to a method for transmitting video information, in which a bitstream is formed comprising a set of frames comprising macroblocks. At least one switching frame is formed into the bitstream, macroblocks of the switching frame are arranged into a first and a second group of macroblocks, each macroblock of the first group of macroblocks are encoded by a first encoding method to provide a switching point for continuing the transmission of video information with another bitstream formed from the video information; and macroblocks of the second group of macroblocks are encoded by another encoding method. Errors in transmission of video information are reduced by forming at least one SP-encoded frame by predictively encoding the macroblocks; replacing part of the SP-encoded macroblocks with intra encoded blocks; and transmitting the encoded frame containing both predictively and intra encoded macroblocks instead of the SP-encoded frame.

34 Claims, 7 Drawing Sheets

U.S. PATENT DOCUMENTS

| | | | |
|---|---|---|---|
| 6,212,235 B1 | 4/2001 | Nieweglowski et al. | |
| 6,229,854 B1 | 5/2001 | Kikuchi et al. | |
| 6,393,055 B1 * | 5/2002 | Martin | 375/240 |
| 6,393,057 B1 * | 5/2002 | Thoreau et al. | 375/240 |
| 6,414,999 B1 | 7/2002 | Igi et al. | |
| 6,434,195 B1 * | 8/2002 | Luthra et al. | 375/240.12 |
| 6,452,971 B1 | 9/2002 | Iwasaki et al. | |
| 6,493,389 B1 | 12/2002 | Bailleul | |
| 6,501,798 B1 | 12/2002 | Sivan | |
| 6,516,002 B1 | 2/2003 | Huang et al. | |
| 6,529,555 B1 * | 3/2003 | Saunders et al. | 375/240.26 |
| 6,611,624 B1 | 8/2003 | Zhang et al. | 382/232 |
| 6,618,438 B1 * | 9/2003 | Le Roux et al. | 375/240.12 |
| 6,633,678 B2 | 10/2003 | Boon | |
| 6,658,056 B1 | 12/2003 | Duruoz et al. | |
| 6,765,963 B2 * | 7/2004 | Karczewicz et al. | 375/240.03 |
| 6,804,301 B2 * | 10/2004 | Wu et al. | 375/240.12 |
| 6,956,600 B1 * | 10/2005 | Gaylord | 348/14.08 |
| 7,046,910 B2 * | 5/2006 | Chen et al. | 386/68 |
| 2002/0118755 A1 | 8/2002 | Karczewicz et al. | |
| 2003/0039308 A1 | 2/2003 | Wu et al. | |
| 2003/0142744 A1 | 7/2003 | Wu et al. | 375/240.03 |
| 2004/0013202 A1 | 1/2004 | Lainema | 375/240.18 |
| 2006/0126733 A1 * | 6/2006 | Boyce et al. | 375/240.12 |

FOREIGN PATENT DOCUMENTS

| | | |
|---|---|---|
| EP | 1045589 | 10/2000 |
| EP | 1079631 | 2/2001 |
| JP | 2000-165816 | 6/2000 |
| WO | 9114340 | 9/1991 |
| WO | 0111891 | 2/2001 |
| WO | 02/054776 | 7/2002 |

OTHER PUBLICATIONS

Patent Abstract, publication No. JP2000188759A2, "High Frame Precision Seamless Splicing Method for Information", Christopher Ward et al.

Patent Abstract, publication No. JP2001119305A2, "Signal Processor", Nicholas Ian Saunders et al.

Patent Abstracts of Japan, publication No. 02154110A, "Water Depth Measuring Device" Yoji Yoshida.

Farber, N. et al.; "Robust H.263 Compatible Video Transmission for Mobile Access to Video Servers"; IEEE 1997; 0-8186-8183-7/97.

Bjontegaard, G., "H.26L Test Model Long Term No. 5 (TML-5) draft0", document Q15-K-59, ITU-T Video Coding Experts Group (Question 15) Meeting, Oregon, USA Aug. 22-25, 2000.

Hibi, K., "Report of the Ad Hoc Committee on H.26L Development", document Q15-H-07, ITU-T Video Coding Experts Group (Question 15) Meeting, Berlin Aug. 3-6, 1999.

Greenbaum, G., "Remarks on the H.26L Project: Streaming Video Requirements for Next Generation Video Compression Standards", document Q15-G-11, ITU-T Video Coding Experts Group (Question 15) Meeting, Monterey, Feb. 16-19, 1999.

Bjontegaard, G., "Recommend Simulation Conditions for H.26L", document Q15-1-62, ITU-T Video Coding Experts Group (Question 15) Meeting, Red Bank, New Jersey, Oct. 19-22, 1999.

Bjontgaard, G., "H.26L Test Model Long Term No. 6 (TML-6) draft0", document.

Wenger, S. et al; "Error Resilience Support in H.263+", document Q15-D-17.

ITU-Telecommunications Standardization Sector, Document VCEG-L45 12th meeting, Eibsee, Germany, Jan. 9-12, 2001.

ITU-Telecommunications Standardization Sector, Document Q15-K-59 Eleventh Meeting: Portland, Oregon, Aug. 22-25, 2000.

ITU-Telecommunications Standardization Sector, Document Q15-I-62 Ninth Meeting: Red Bank, New Jersey, Oct. 19-22, 1999.

ITU-Telecommunications Standardization Sector, Document Q15-H-07 Eighth Meeting: Berlin, Aug. 3-6, 1999.

ITU-Telecommunications Standardization Sector, Document 015-G-11 Seventh Meeting: Monterey, Feb. 16-19, 1999.

ITU-Telecommunications Standardization Sector, Document Q15-D-17 Fourth Meeting: Tampere, Finland, Apr. 21-24, 1998.

"Robust H.263 Compatible Video Transmission for Mobile Access to Video Servers" by N. Farber et al, 1997 IEEE, pp. 73-76.

"Error Resilience Support in H.263+" Stephan Wenger et al pp. 2-21.

Patent Abstracts of Japan, Abstract of JP 2000-165816 A Jun. 16, 2000.

Canadian Office Action (Application No. 2,431,866) dated Dec. 6, 2007 (4 pages).

Chinese Office Action dated Dec. 26, 2008, 2 pages filled in First Office Action form in English, 14 pages English translation of Text of First Office Action and 6 pages Chinese originals of both the form and the Text of the First Office Action.

* cited by examiner

TRANSMISSION OF VIDEO INFORMATION

CROSS-REFERENCE TO RELATED APPLICATIONS

This application is a continuation-in-part of U.S. patent application Ser. No. 10/250,838 filed Jan. 9, 2004 as the U.S. National Stage of International Application No. PCT/FI02/00004 filed Jan. 3, 2002 claiming priority from U.S. patent application Ser. No. 09/925,769 filed Aug. 9, 2001 as a continuation-in-part of U.S. patent application Ser. No. 09/883,887 filed Jun. 18, 2001 as a continuation-in-part of U.S. patent application Ser. No. 09/827,796 filed Apr. 6, 2001 and from U.S. Provisional Application Ser. No. 60/259,529 filed Jan. 3, 2001.

FIELD OF THE INVENTION

The present invention relates to a method for transmitting video information, in which at least one bitstream is formed from the video information comprising a set of frames. The invention also relates to an encoder, a decoder, a transmission system, a signal, and a computer product.

BACKGROUND OF THE INVENTION

A typical video stream comprises a sequence of pictures, often referred to as frames. The frames comprise pixels arranged into a rectangular form. In existing video coding standards, such as H.261, H.262, H.263, H.264 and MPEG-4, three main types of pictures are defined: Intra frames (I-frames), Predictive frames (P-frames) and Bi-directional frames (B-frames). Each picture type exploits a different type of redundancy in a sequence of images and consequently results in different level of compression efficiency and, as explained in the following, provides different functionality within the encoded video sequence. An intra frame is a frame of video data that is coded by exploiting only the spatial correlation of the pixels within the frame itself without using any information from the past or the future frames.

Intra frames are used as the basis for decoding/decompression of other frames and provide access points to the coded sequence where decoding can begin.

A predictive frame is a frame that is encoded/compressed using motion compensated prediction from a so-called reference frame, i.e. one or more previous/subsequent Intra frames or Predictive frames available in an encoder or in a decoder. A bi-directional frame is a frame that is encoded/compressed by prediction from a previous Intra frame or Predictive frame and/or a subsequent Intra frame or Predictive frame.

Since adjacent frames in a typical video sequence are highly correlated, higher compression can be achieved when using Bi-directional or Predictive frames instead of Intra frames. On the other hand, when the temporal predictive coding is employed within the coded video stream, B-frames and/or P-frames cannot be decoded without correctly decoding all the other previous and/or subsequent reference frames which were used with coding of the Bi-directional and Predictive frames. In situations in which the reference frame(s) used in the encoder and respective reference frame(s) in the decoder are not identical either due to errors during transmission or due to some intentional action on the transmitting side, the subsequent frames that make use of prediction from such a reference frame can not be reconstructed on the decoding side to yield a decoded frame identical to that originally encoded on the encoding side. This mismatch is not only confined to a single frame but further propagates in time due to the use of motion compensated coding.

FIGS. 1A-1C illustrate the types of encoded/compressed video frames used in a typical video encoding/decoding system. For example, prior to encoding, the pictures of the video sequence are represented by these matrices of multiple-bit numbers, one representing the luminance (brightness) of the image pixels, and the other two each representing a respective one of two chrominance (color) components. FIG. 1A depicts the way in which an Intra frame 200 is encoded using only image information present in the frame itself. FIG. 1B illustrates construction of a Predictive frame 210. Arrow 205a represents the use of motion compensated prediction to create the P-frame 210. FIG. 1C depicts construction of Bi-directional frames 220. B-frames are usually inserted between I-frames or P-frames. FIG. 2 represents a group of pictures in display order and illustrates how B-frames inserted between I- and P-frames, as well as showing the direction in which motion compensation information flows. In FIGS. 1B, 1C and 2, arrows 205a depict forward motion compensation prediction information necessary to reconstruct P-frames 210, whereas arrows 215a and 215b depict motion compensation information used in reconstructing B-frames 220 in forward direction (215a) and backward direction (215b). In other words, the arrows 205a and 215a show the flow of information when predictive frames are predicted from frames that are earlier in display order than the frame being reconstructed, and arrows 215b show the flow of information when predictive frames are predicted from frames that are later in display order than the frame being reconstructed.

In motion compensated prediction, the similarity between successive frames in a video sequence is utilized to improve coding efficiency. More specifically, so-called motion vectors are used to describe the way in which pixels or regions of pixels move between successive frames of the sequence. The motion vectors provide offset values and error data that refer to a past or a future frame of video data having decoded pixel values that may be used with the error data to compress/encode or decompress/decode a given frame of video data.

The capability to decode/decompress P-frames requires the availability of the previous I- or P-reference frame, furthermore in order to decode a B-frame requires the availability of the subsequent I- or P-reference frame is also required. For example, if an encoded/compressed data stream has the following frame sequence or display order:

$I_1 B_2 B_3 P_4 B_5 P_6 B_7 P_8 B_9 B_{10} P_{11} \ldots P_{n-3} B_{n-2} P_{n-1} I_n$, the corresponding decoding order is:

$I_1 P_4 B_2 B_3 P_6 B_5 P_8 B_7 P_{11} B_9 B_{10} \ldots P_{n-1} B_{n-2} I_n$.

The decoding order differs from the display order because the B-frames require future I- or P-frames for their decoding. FIG. 2 displays the beginning of the above frame sequence and can be referred to in order to understand the dependencies of the frames, as described earlier. P-frames require the previous I- or P-reference frame be available. For example, $P_4$ requires $I_1$ to be decoded. Similarly, frame $P_6$ requires that $P_4$ be available in order to decode/decompress frame $P_6$. B-frames, such as frame $B_3$, require a past and/or a future I- or P-reference frame, such as $P_4$ and $I_1$ in order to be decoded. B-frames are frames between I- or P-frames during encoding.

Video streaming has emerged as an important application in the fixed Internet. It is further anticipated that video streaming will also be important in the future of 3G wireless networks. In streaming applications the transmitting server starts transmitting a pre-encoded video bit stream via a transmission network to a receiver upon a request from the receiver.

The receiver plays the video stream back while receiving it. The best-effort nature of present networks causes variations in the effective bandwidth available to a user due to the changing network conditions. To accommodate these variations, the transmitting server can scale the bit rate of the compressed video. In the case of a conversational service characterized by real-time encoding and point-to-point delivery, this can be achieved by adjusting the source encoding parameters on the fly. Such adjustable parameters can be, for example, a quantisation parameter, or a frame rate. The adjustment is advantageously based on feedback from the transmission network. In typical streaming scenarios when a previously encoded video bit stream is to be transmitted to the receiver, the above solution cannot be applied.

One solution to achieve bandwidth scalability in case of pre-encoded sequences is to produce multiple and independent streams having different bit-rates and quality. The transmitting server then dynamically switches between the streams to accommodate variations in the available bandwidth. The following example illustrates this principle. Let us assume that multiple bit streams are generated independently with different encoding parameters, such as quantisation parameter, corresponding to the same video sequence. Let $\{P_{1,n-1}, P_{1,n}, P_{1,n+1}\}$ and $\{P_{2,n-1}, P_{2,n}, P_{2,n+1}\}$ denote the sequence of decoded frames from bit streams 1 and 2, respectively. Since the encoding parameters are different for the two bit streams, frames reconstructed from them at the same time instant, for example, frames $P_{1,n-1}$ and $P_{2,n-1}$, are not identical. If it is now assumed that the server initially sends encoded frames from bit stream 1 up to time n after which it starts sending encoded frames from bit stream 2, the decoder receives frames $\{P_{1,n-2}, P_{1,n-1}, P_{2,n}, P_{2,n+1}, P_{2,n+2}\}$. In this case $P_{2,n}$ cannot be correctly decoded since its reference frame $P_{2,n-1}$ is not received. On the other hand, the frame $P_{1,n-1}$, which is received instead of $P_{2,n-1}$, is not identical to $P_{2,n-1}$.

Therefore switching between bit streams at arbitrary locations leads to visual artefacts due to the mismatch between the reference frames used for motion compensated prediction in the different sequences. These visual artefacts are not only confined to the frame at the switching point between bit streams, but propagates in time due to the continued motion compensated coding in the remaining part of the video sequence.

A video streaming/delivery system inevitably suffers from video quality degradation due to transmission errors. The transmission errors can be roughly classified into random bit errors and erasure errors (packet loss). Many error control and concealment techniques try to avoid this problem by forward error concealment, post-processing and interactive error concealment. The predicted video coding mechanism has low tolerance on packet loss where the error caused by a missing block will propagate and thus create objectionable visual distortion. The intra macroblock insertion, which is based on the forward error concealment, can stop the error propagation by introducing a self-contained intra macroblock and concealing the erroneous block. The problem with the introduced intra macroblock is that the coding of such a macroblock increases the amount of information of the bit stream, thus reducing coding efficiency, and that it is not scalable.

A good error resilience tool is important when retransmission for lost packet is not possible. An Adaptive Intra Refresh (AIR) system described in MPEG-4 standard (Worral, "Motion Adaptive Intra Refresh for MPEG-4", Electronics Letters November 2000) Worral mentions the inserting intra macroblocks at later and later positions in succeeding frames as part of a motion-adaptive scheme. Deciding when to insert the macroblocks (when bandwidth is available for that frame) is shown to benefit from identifying image areas with high motion. Worral notes that his approach is backward-compatible with the standard (does not require a standard change). The encoder moves down the frame encoding intra macroblocks until the number of preset macroblocks have been encoded. For the next frame the encoder starts in the same position, and begins encoding intra macroblocks.

The purpose of the insertion of intra macroblocks is to try to minimize the propagation of artefacts caused by an erroneous macroblock and to stop the propagation. Another alternative is the Random Intra Refresh (RIR) used in the JM61e H.264 reference software where intra macroblocks are randomly inserted. However, as soon as the intra macroblock is inserted it cannot be replaced by a predicted block which in general is much smaller in size. In another words, the coding efficiency is fixed for systems based on the Adaptive Intra Refresh or the Random Intra Refresh. For a wireless connection the packet loss rate is different from time to time, wherein schemes such as AIR cannot reflect the packet loss rate to optimize for the performance. In another words, the error protection of AIR is non-scalable. In good connection conditions the quality is not optimized due to the inserted intra blocks.

It is important for Video Streaming Server to be able to adapt to different connection conditions and different network types such as wired and wireless networks. Bitstream switching scheme where multiple bitstreams are used provides a low complexity way for a server to adapt to varying connection conditions without re-encoding video content, which requires high computation power. However, switching from one bitstream to another produces pixel drift problem if the switching takes place at a predicted frame. Since the reference frame is taken from another bitstream, the mismatch would propagate and thus degrade the video quality.

The problem with bitstream switching is that the switching point must be an intra frame (key frame), otherwise a pixel mismatch which degrades the video quality will occur until the next intra frame. During a video streaming session it is desirable that the switching can take place at any frame. However, it is not easy to implement such a system without affecting significant reduction to coding efficiency.

Regular intra frames can be used to provide switching points. But, more frequent the intra frames more bits are required which will lower the video quality. One scheme provides extra bitstream with all intra frames at a certain period of, say, one second and during switching the intra frame will be used for switching, which will minimize the prediction error. Another simple technique is just to switch at any frame, which in general suffers from pixel drift quite significantly.

A correct (mismatch-free) switching between video streams can be enabled by forming a special type of a compressed video frame and inserting frames of the special type into video bit-streams at locations where switching from one bit-stream to another is to be allowed. The patent application WO02054776 describes switching frames which are used for enabling the system to perform the switching from one bit stream to another without the need to insert Intra frames into the bit stream for switching locations. The special type of compressed video frame will be referred to generally as an S-frame (Switching). More specifically, S-frames may be classified as SP-frames (Switching Predictive), which are formed at the decoder using motion compensated prediction from already decoded frames using motion vector information, and SI-frames, which are formed at the decoder using spatial (intra) prediction from already decoded neighbouring pixels within a frame being decoded. In general, an S-frame is formed on a block-by-block basis and may comprise both inter-coded (SP) blocks as well as intra-coded (SI) blocks (Switching Intra).

The special type of frame allows switching between bit streams to occur not only at the locations of I-frames but also at the locations of the SP-frames. The coding efficiency of an SP-frame is much better than the coding efficiency of a typical I-frame wherein less bandwidth is needed to transmit bit streams having SP-frames in locations where I-frames would be used. The switching of one bit stream into another can be performed at locations in which an SP-frame is placed in the encoded bit stream.

SUMMARY OF THE INVENTION

It is an aim of the present invention to provide a new method and a system for transmitting video images. The invention is based on the idea that some of the macroblocks of SP-frames are replaced with Intra macroblocks or SI-macroblocks. This procedure is repeated to successive frames so that after a certain number of successive SP-frames are transmitted and decoded, substantially all macroblocks of the frame area (image) are replaced with intra macroblocks. This means that substantially the whole image area is refreshed by the Intra macroblocks or SI-macroblocks. In an example implementation of the invention the replacement procedure proceeds slice-by-slice until enough number of frames are modified. In other words, in the first SP-frame to be modified macroblocks of the first slice are replaced with intra macroblocks (SI-slice), in the second frame macroblocks of the second slice are replaced with intra macroblocks, etc. In the nth frame macroblocks of the last slice are replaced with intra macroblocks. However, the replacement order can be different in different implementations. It is also possible to apply the invention so that the replacement order is not fixed but it is variable. Further, it is also possible that the number of replaced macroblocks need not be more than one, i.e. in some situations one macroblock is replaced by another macroblock. For example, this kind of replacement may be used in a situation in which a slice contains only one macroblock and that macroblock is replaced by another type of macroblock.

The above described systematic intra refresh (SIR) scheme according to the invention systematically refreshes the whole image with intra macroblocks and thus blocks the error propagation due to the packet loss. This scheme can also be used for bitstream switching at any frame. When switching, SI slices are used for certain number of the first frames after the switching frame so that all the macroblocks for the whole image will be refreshed, i.e. provided with intra-encoded macroblocks (Intra Blocks).

According to a first aspect of the present invention there is provided a method for transmitting video information, in which at least one bitstream is formed from the video information comprising a set of frames, the frames comprising macroblocks, wherein the method comprises:

forming at least one switching frame into said bitstream;
arranging macroblocks of said switching frame into a first and a second group of macroblocks;
encoding each macroblock of said first group of macroblocks by a first encoding method to provide a switching point for continuing the transmission of video information with another bitstream formed from the video information; and encoding macroblocks of said second group of macroblocks by another encoding method.

According to a second aspect of the present invention there is provided an encoder for encoding video information into at least one bitstream, the video information comprising a set of frames comprising macroblocks, the encoder comprising:

means for forming at least one switching frame into said bitstream;
grouping means for arranging macroblocks of said switching frame into a first and a second group of macroblocks;
first encoding means for encoding each macroblock of said first group of macroblocks by a first encoding method to provide a switching point for continuing the transmission of video information with another bitstream formed from the video information; and
second encoding means for encoding macroblocks of said second group of macroblocks by another encoding method.

According to a third aspect of the present invention there is provided a transmission system for transmitting video information, the system comprising an encoder for encoding video information into at least one bitstream, a transmitter for transmitting the bit stream to a receiver, and a decoder for decoding the bitstream transmitted to the receiver, the video information comprising a set of frames comprising macroblocks, the encoder comprising:
means for forming at least one switching frame into said bitstream;
grouping means for arranging macroblocks of said switching frame into a first and a second group of macroblocks;
first encoding means for encoding each macroblock of said first group of macroblocks by a first encoding method to provide a switching point for continuing the transmission of video information with another bitstream formed from the video information; and
second encoding means for encoding macroblocks of said second group of macroblocks by another encoding method;

the decoder comprising
first decoding means for decoding each macroblock of said first group of macroblocks by a first decoding method corresponding to the first encoding method; and
second decoding means for decoding each macroblock of said second group of macroblocks by a second decoding method corresponding to the second encoding method.

According to a fourth aspect of the present invention there is provided a computer program product comprising machine executable steps for transmitting video information, in which at least one bitstream is formed from the video information comprising a set of frames, the frames comprising macroblocks, wherein the computer program product further comprises machine executable steps for:

forming at least one switching frame into said bitstream;
arranging macroblocks of said switching frame into a first and a second group of macroblocks;
encoding each macroblock of said first group of macroblocks by a first encoding method to provide a switching point for continuing the transmission of video information with another bitstream formed from the video information; and
encoding macroblocks of said second group of macroblocks by another encoding method.

According to a fifth aspect of the present invention there is provided a method for reducing effects of transmission errors in transmission of video information, in which at least one bitstream is formed from the video information comprising a set of frames, the frames comprising macroblocks, wherein the method comprises:

forming at least one SP-encoded frame into said bitstream by predictively encoding the macroblocks of the frame;

replacing part of the SP-encoded macroblocks with macroblocks encoded by an intra encoding method; and transmitting the encoded frame containing both predictively encoded macroblocks and intra encoded macroblocks instead of said SP-encoded frame.

According to a sixth aspect of the present invention there is provided a computer program product comprising machine executable steps for reducing effects of transmission errors in transmission of video information, in which at least one bitstream is formed from the video information comprising a set of frames, the frames comprising macroblocks, wherein the computer program product further comprises machine executable steps for:

forming at least one SP-encoded frame into said bitstream by predictively encoding the macroblocks of the frame;

replacing part of the SP-encoded macroblocks with macroblocks encoded by an intra encoding method; and transmitting the encoded frame containing both predictively encoded macroblocks and intra encoded macroblocks instead of said SP-encoded frame.

According to a seventh aspect of the present invention there is provided a signal for transmitting video information, in which at least one bitstream is formed from the video information comprising a set of frames, the frames comprising macroblocks, wherein the signal comprises:

at least one switching frame;

macroblocks of said switching frame being arranged into a first and a second group of macroblocks;

each macroblock of said first group of macroblocks being encoded by a first encoding method to provide a switching point for continuing the transmission of video information with another bitstream formed from the video information; and macroblocks of said second group of macroblocks being encoded by another encoding method.

The coding efficiency of the method according to the invention is typically better than with the prior art AIR scheme because the coding efficiency for SP macroblock is typically better than an intra macroblock. It has also been measured that the method according to the invention makes the recovery from packet loss typically faster than AIR. The method according to the invention can also be used for bitstream switching while AIR is not very well suitable for this purpose.

Compared with intra frame switching scheme of prior art, each intra frame is large in size while SP-frame with one SI slice is smaller in size, so during the switching the intra frame requires an increase of the transmission rate while SI slices will spread the bandwidth more evenly.

The invention can provide a scalable error protection for the bitstream, which typically improves the quality of the video during transmission at any packet loss condition. This invention also provides means for bitstream switching at any frame with little pixel drift.

The invention typically improves the error resiliency and speeds up the recovering from packet losses compared with the described prior art solutions.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention, for which reference should be made to the appended claims.

DESCRIPTION OF THE DRAWINGS

In the following the invention will be described in more detail with reference to the appended drawings, in which.

DETAILED DESCRIPTION OF THE INVENTION

Figure 8:
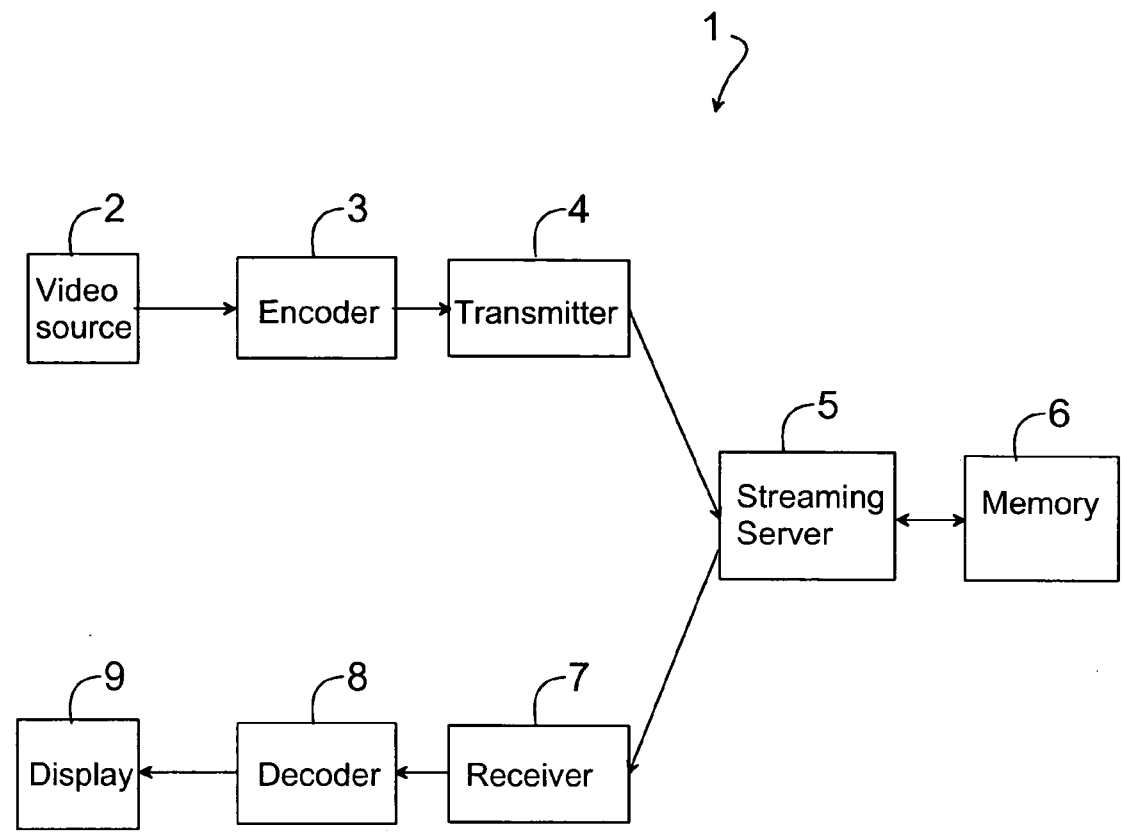
FIG. 8 is a block diagram of a system in accordance with an example embodiment of the invention.

In the following, the method according to an example embodiment of the invention will be described in more detail with reference to the system 1 of FIG. 8 and frames of FIGS. 3a and 3b. In the encoder 3 one or more bit streams are formed from a video signal from of a video source 2. The video signal can be any digital video signal comprising multiple images, i.e. an image sequence. If multiple bit streams are formed, each of them is encoded from the same video signal using at least partly different encoding parameters. For example, the bit rate can be altered by selecting the encoding parameters differently, and in this way bit streams with different bit rates can be formed. The encoding parameters can be, for example, frame rate, quantisation parameter, spatial resolution, or another factor affecting the image size. The encoder 3 also inserts at least one Intra frame 10 to each bit stream. Typically, at least the first frame of each bit stream is preferably an Intra frame. This enables the decoder 8 to start reconstruction of the video signal. The encoder 3 encodes the I-frames, P-frames, B-frames, SP-frames and SI-frames from the video signal.

The encoder 3 also inserts frames encoded using motion compensated predictive coding (P-frames and optionally B-frames) into the bit streams. The encoder also inserts SP-frames 11-19 into each bit stream at locations where switching between different bit streams will be allowed. The SP-frames may be used at locations where in prior art methods an Intra coded frame would be inserted, or the SP-frames may be used in addition to using Intra coded frames in the video sequence. The different bit streams are, for example, transmitted by the transmitter 4 to a streaming server 5. In the streaming server 5 the bit streams can be stored into memory 6 for later use. However, it is also possible that transmission to the receiver 7 may take place substantially immediately after encoding wherein it is not necessary to store complete video sequences, but storing the necessary reference frames suffices. Transmission of the encoded video stream may be performed e.g. by a streaming server 5. The transmitting server 5 can also have means for transmitting the bit stream to the transmission network (not shown) and/or directly to the receiver 7.

Figure 1A:
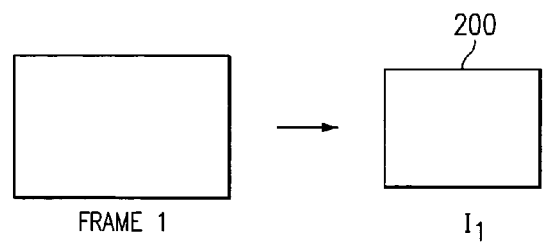
FIGS. 1A-1C and 2 are diagrams showing the prior art encoding/compression of video frames.
Figure 1B:
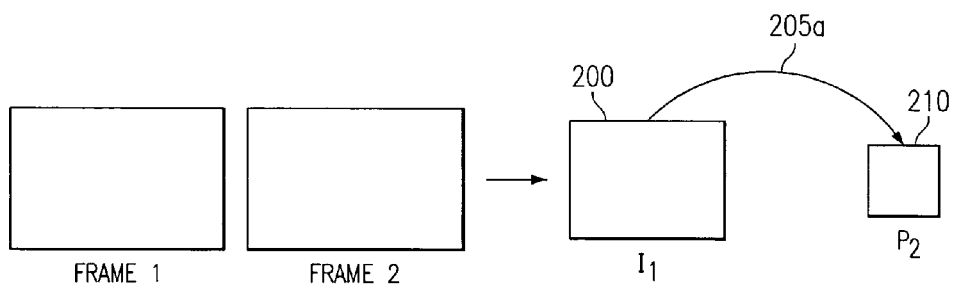
Figure 1C:
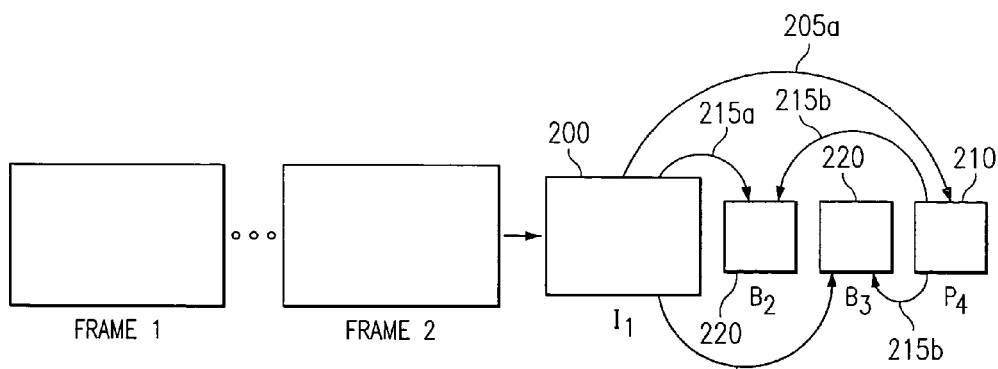
Figure 2:
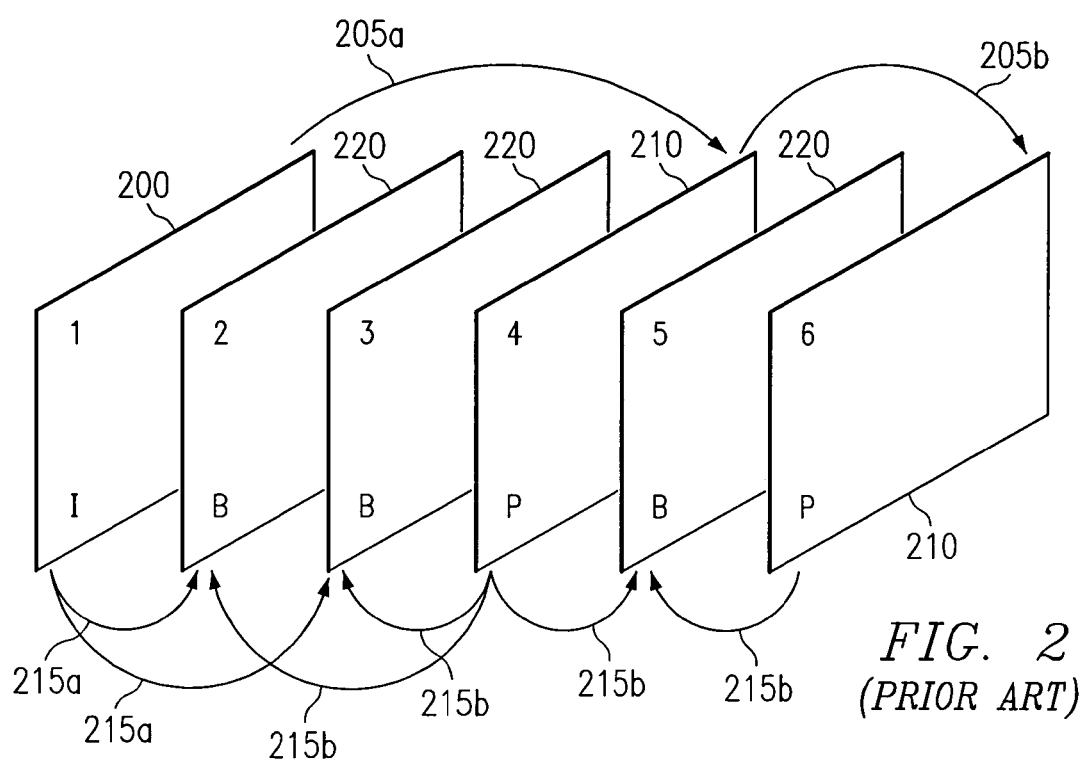
Figure 3A:
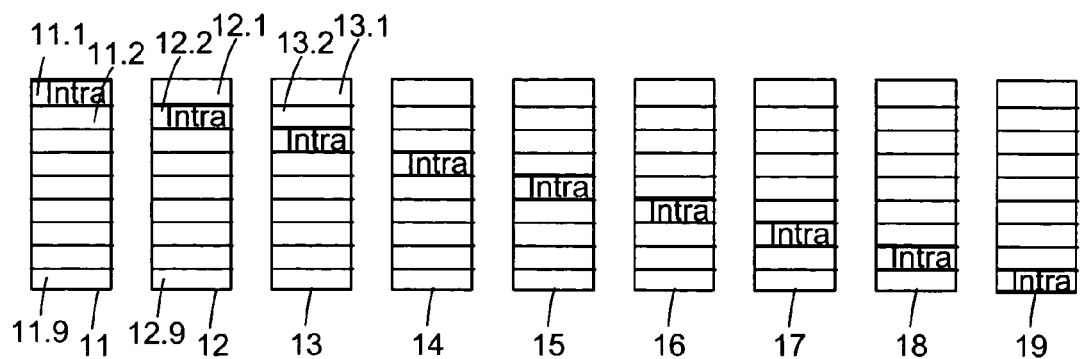
FIG. 3a is an illustration showing examples of frames encoded using a method according to the invention.
Figure 3B:
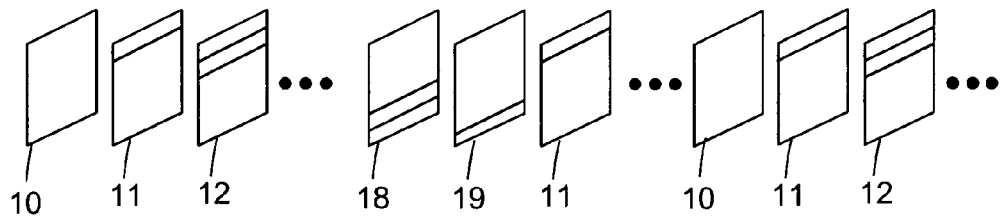
FIG. 3b is an illustration showing example of a sequence of frames comprising frames encoded using a method according to the invention.

In the example of FIG. 3a QCIF images are used as an example of encoded images. The size of QCIF image is 176 by 144 pixels arranged into 9 rows of 11 macroblocks. The rows can also be called as slices or groups of macrobocks (GOB). Each macroblock consists of 16×16 pixels in this example. The frames 11-19 of FIG. 3a can be formed in the encoder 3 in the following way. The encoder 3 encodes the macroblocks of the first slice 11.1 of the first P-frame 11 by using intra encoding wherein the first slice 11.1 contains intra blocks (in this case 11 macroblocks out of 99 macroblocks). The encoder 3 encodes the macroblocks of the other slices 11.2-11.9 by using some predictive coding to form predicted blocks such as P- or B-blocks. When the encoder 3 encodes the next frame 12, another slice, for example the second slice 12.2, is intra encoded and the other slices including the first slice 12.1 are encoded by using the predictive encoding method. Next, the third frame 13 is encoded so that yet another slice of the third frame 13 (i.e. not the first 13.1 and not the second slice 13.2) is intra encoded and all the other slices are encoded by the predictive encoding method. The procedure will be repeated until substantially all the slices of the image are intra encoded at least once. In the QCIF image example this requires 9 repetitions, i.e. 9 frames 11-19 are formed in which one slice is intra encoded and the other slices are encoded by the predictive encoding method. By doing so, the whole image can be refreshed within 9 frames for QCIF image. By using the method according to the present invention only a minor part of the frames are intra encoded requiring higher bit rate while the majority of the frames are predictively encoded. In practice this means that the invention does not significantly increase the size of the encoded frames in the bit stream and still error recovery can be performed faster than with prior art methods.

The encoder 3 encodes also at least one intra frame 10 and inserts it to the bit stream so that the bit stream can be decoded and the images can be reconstructed at the receiving end. The encoder 3 can further add P-frames, B-frames, SP-frames and SI-frames to the bit stream as in prior art systems. FIG. 3b illustrates an example of a sequence of encoded frames containing frames which are encoded according to the present invention. The sequence contains one or more Intra frames 10 after which there are a number of predicted frames 11-19 which have been encoded so that all the macroblocks of one slice of the frames are Intra encoded macroblocks. The Intra frames 10 can be used as switching points, for example, to change the bit rate, to provide a proper place for a scene change, etc.

It is not necessary to modify all the predicted frames according to the invention. The modification can be performed, for example, if the network, the streaming server 5, the decoder 8 or some other element of the system notices that possibly one or more transmitted packets are lost or corrupted so that the decoder 8 can not properly decode the bit stream. The element which notices the error informs it, for example, to the streaming server 5 which then begins to transmit the modified predicted frames 11-19 containing slices of Intra encoded macroblocks. If such frames are not present at the memory 6 (for example the encoder 3 has not encoded such frames), the streaming server 5 informs the encoder 3 and asks it to modify the predicted frames according to the invention. When all the slices are refreshed, i.e. enough number of modified predicted frames 11-19 have been transmitted from the streaming server 5 (or from the encoder 3) and received by the receiver 7 and decoded by the decoder 8, the visual artefacts caused by the packet loss are eliminated or almost eliminated and the normal encoding/decoding process can continue.

The order in which the slices of the frames are Intra encoded is not necessarily from top (the first slice) to bottom (the last slice) of the frame as described above, but it can also be different from that. In some implementations the order can even be random or virtually random, for example an arbitrary shape that uses Flexible Macroblock Ordering (FMO) described in H.264 standard. The order can also vary during the encoding process. For example, in a first set of modified frames the order is from top to bottom, in a second set of modified frames the order is such that in the first frame of the second set of modified frames the second slice contains Intra encoded macroblocks, in the second frame the third slice is Intra encoded, and so on to the frame before the last frame of the second set of modified frames in which the last slice is Intra encoded, and in the last frame of this second set of modified frames the first slice is Intra encoded.

Figure 4:
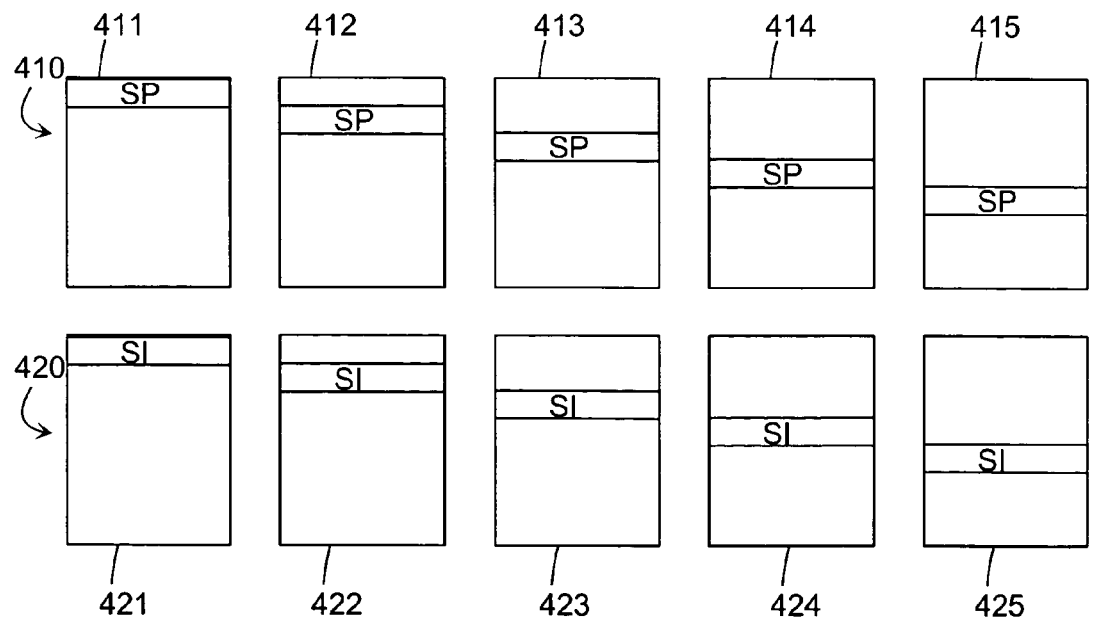
FIG. 4 is an illustration showing another example of a sequence of frames encoded using a method according to the invention.
Figure 5:
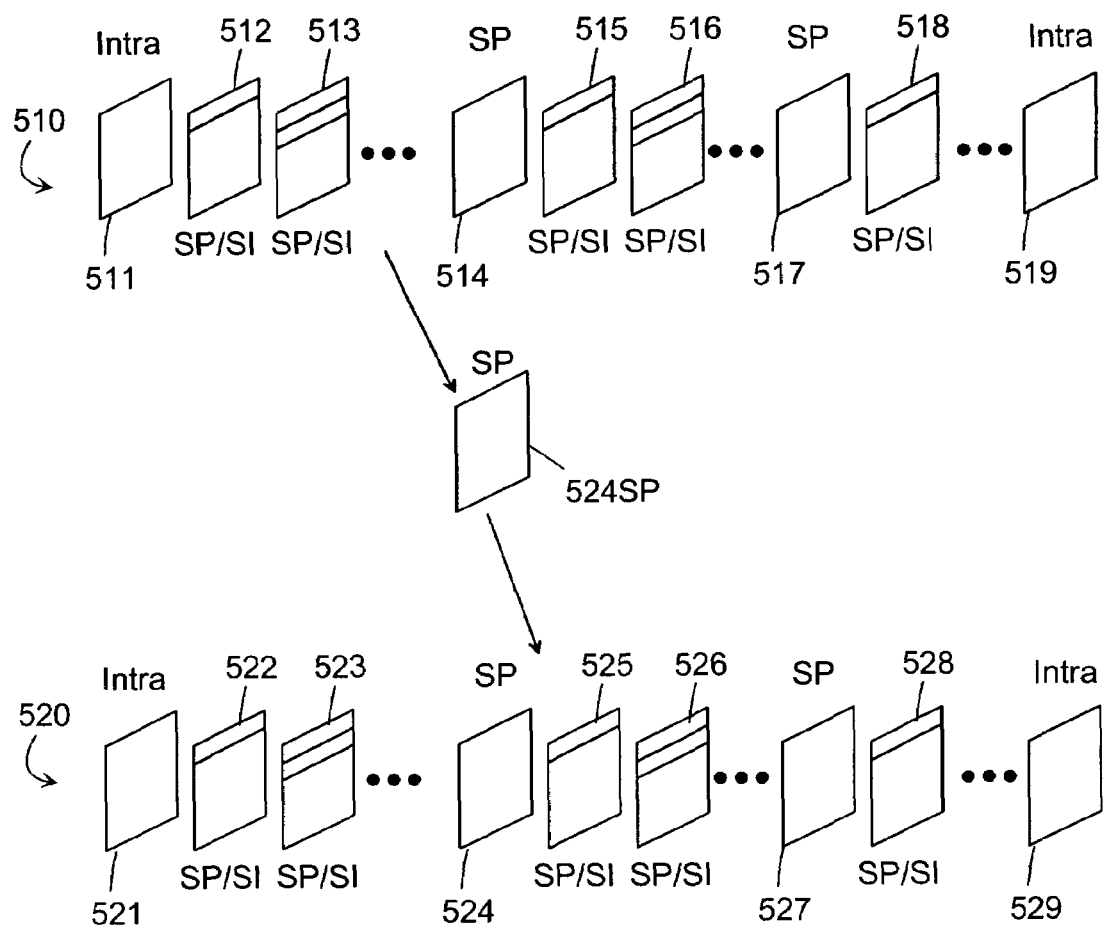
FIG. 5 is an illustration showing switching between two different bit streams using SP/SI-frames according to the invention.

The invention can also be implemented in connection with switching from one bit stream into another. The invention also enables the transmission system to adjust the intra refresh rate adaptively. SP-picture and SI-picture according to H.264 standard are specially encoded frames where they can be perfectly reconstructed by another SP or SI frames. This property enables the invention to adjust the intra refresh rate adaptively. This invention uses systematic intra refresh scheme described above. With reference to FIGS. 4 and 5, two bitstreams 410, 420 are encoded, one encoded with SP slices throughout the whole sequence and the other one encoded with SI slices, which are the exact replicas for all the SP slices. In the example situation mentioned above where QCIF images are used, one QCIF-image contains 176×144 pixels arranged to macroblocks of 16×16 pixels. Therefore, the QCIF image comprises 9 slices and only one or some of them is/are encoded with SP/SI macroblocks according to the invention. In general, an intra macroblock including SI macroblock requires more bits to encode than a predicted macroblock including SP macroblock. Compared with intra-encoded slices, the SP encoded slices are much smaller in size. Since every SP macroblock can be replaced by a SP or SI macroblock without causing any pixel drift problem, so when during the streaming session the bitstream encoded with SP slices can be used to stream to the client (receiver 7) and when the streaming server 5 detects packet loss then SI slices can replace SP slices to conceal the error. Normally any damage to the image can be recovered by SI slices after 9 frames in QCIF case. It is possible to randomly deploy the SI slices depending the rate of lost packets. The advantage of the invention over the AIR is that the coding efficiency is typically better for SP slices during good network conditions and for bad network conditions the systematic intra refresh scheme can typically recover the error faster.

In the following, the method for this implementation according to an example embodiment of the invention is described. The encoder 3 forms two different encoded frames 411-415, 421-425 (in FIG. 4 only some of the frames are shown) from the same picture information. The first set 410 of frames is encoded using SP encoding, i.e. the slices depicted in FIG. 4 of the frames 411-415 are SP-encoded slices, in the figure one slice per frame. The second set 420 of frames is encoded so that, for example, one slice of each frame 421-425 is SI-encoded while the other slices of the frames are P-encoded. The two sets 410, 420 of frames can, for example, be stored to the memory 6 of the streaming server 5 for delivery to clients (receivers) either substantially immediately or at a later stage, for example, upon a request by a client device (a receiver). The encoder 3 has also encoded one or more Intra frames and, possibly, P- and/or B-frames into the bit stream. In a normal transmission the SP-encoded frames 411-415 are transmitted and if the streaming server 5 detects that an error has occurred during the transmission of the frames it begins to transmit the frames of the second set 420 of frames (i.e. the encoded frames 421-425 containing one or a few SI-encoded slices) instead of the frames of the first set of frames. When enough frames of the second set 420 of frames have been transmitted the streaming server 5 can switch to transmit the frames of the first set 410 of frames.

The problem of SIR encoded with intra slices can be that the viewer may perceive a disturbing effect that a scrolling slice rolling from top of the image to the bottom over and over again. This problem can also exist for the SP-encoded frames containing SI-encoded slices, however the effect is less visible and it only happens for the first SP/SI frame. For SP/SI slice scheme, the first 9 frames for QCIF size image will show similar effect as in SIR case, but it will typically not show any more visual artifacts after that. One method to solve this problem is to encode one SP frame right after an intra frame (generally a scene change frame).

Encoding a bitstream for video streaming requires many key frames (in general intra frames) to allow fast forward/backward operation as well as indexing. With reference to FIG. 5, scene change could be encoded with intra frame 510, 519 and between these two intra frames multiple SP frames 514, 517 could be inserted for fast playback, searching, bitstream switching and error concealment since the SP frames can be replaced with SI frames when necessary. Between them, SP/SI-frames 512, 513, 515, 516, 518 could be placed for error concealment and emergency switching.

In an example embodiment of the invention the SP slices and SP frames are encoded first and then SI slices and SI frames. The extra bitstream containing SI slices and frames can be stored along with the main SP bitstream. Each set of bitstreams contains a main bitstream and a SI bitstream and all the main bitstreams of each set are encoded at different bitrates to be used for different connection speeds.

FIG. 5 depicts a part of a first bit stream 510 and a part of a second bit stream 520, which are formed in the encoder 3. Only a few frames of the respective bit streams are shown. Specifically, the first bit stream 510 is shown to comprise I-frames 511, 519, SP-frames 514, 517 and SP/SI-frames 512, 513, 515, 516, 518, while the second bit stream 520 comprises corresponding I-frames 521, 529, SP-frames 524, 527 and SP/SI-frames 522, 523, 525, 526, 528. It should be noted here that not all the SP/SI frames between SP-frames are shown for clarity. It is assumed that the two bit streams 510 and 520 correspond to the same sequence encoded at different bit rates, for example, by using different frame rates, different spatial resolutions or different quantisation parameters. It is further assumed that the first bit stream 510 is being transmitted from the transmitting server 5 to a decoder 8 (FIG. 7) via a transmission network (not shown), and that the transmitting server 5 receives a request from the transmission network to change the bit rate of the video stream being transmitted.

SP-frames are placed in the bit stream during the encoding process at those locations within the video sequences where switching from one bit stream to another is allowed. When the transmitting server 5 reaches the frame of the video sequence encoded as SP-frame 514 in the first bit stream 510, it can begin the necessary operations to continue transmission of the video stream using the encoded frames of the second bit stream 520. At that point the transmitting server 5 has already transmitted frames preceding the SP-frame 514 of the first bit stream 510 and the decoder 8 has received and decoded the respective frames. Thus, those frames have already been stored in the frame memory 750 of the decoder 8. The frame memory 750 comprises sufficient memory to store all those frames, which are needed to reconstruct a P-frame or a B-frame, i.e. the necessary information of all the reference frames required by the current frame to be reconstructed.

The transmitting server 5 performs the following operations to continue the transmission of the video stream using the encoded frames of the second bit stream 520. The transmitting server 5 notices, for example, by examining the type information of the frame, that the current frame to be transmitted is an SP-frame, so it is possible to perform switching between the bit streams. Of course, switching is only performed if a request to do so has been received or there is for some other reason a need to perform the switching. The transmitting server 5 inputs the corresponding SP-frame 524SP of the second bit stream, and transmits the SP-frame 524SP to the decoder 8. SP-frame 524SP is a predicted frame using frame 513 as a reference frame to reconstruct SP-frame 524. After the transmission of the SP-frame 524SP the transmitting server 5 continues to transmit the encoded frames of the second bit stream 520, i.e., SP/SI-frames 525, 526 following the SP-frame 524SP, other SP-frames 527 and so on.

Next, encoding of the S-frames placed within the bit stream, e.g. S-frames 513 and 523 is described.

Generally, an SP/SI-frame according to the invention such as frames 512, 522, 513, 523 in FIG. 5 is constructed on a block-by-block basis. As explained earlier, a group of blocks e.g. a slice is coded in such a way as to take advantage of the spatial correlations among pixels of the image being coded (intra or SI-blocks). Other blocks are coded in such a way as to take advantage of the temporal correlation between blocks of pixels in successive frames of a video sequence (inter or SP-blocks).

Figure 6:
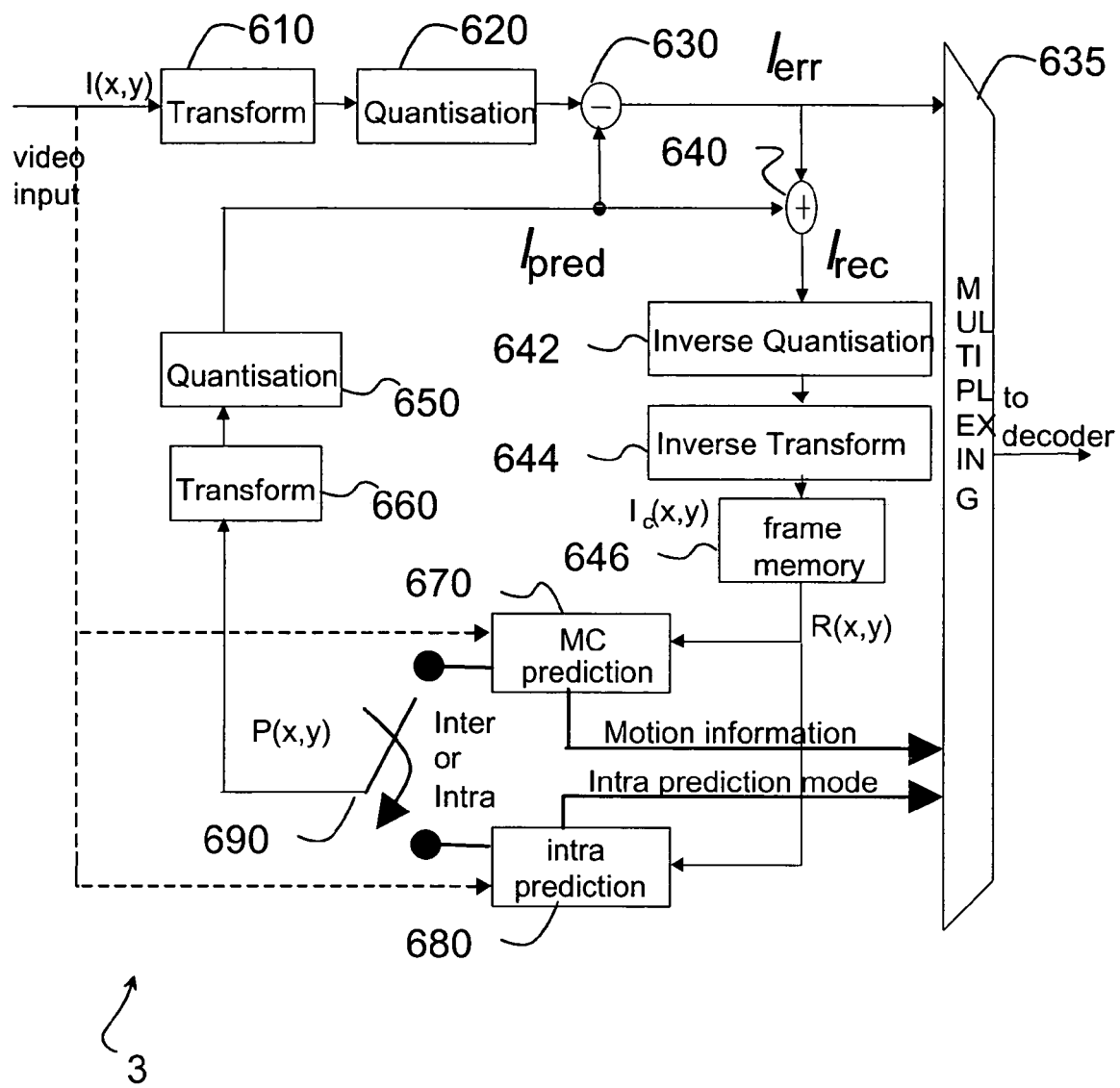
FIG. 6 is a block diagram of an encoder in accordance with an example embodiment of the invention.

The encoding of S-frames according to the invention will be described with reference to FIG. 6 which is a block diagram of a frame encoder 3 according to a first embodiment of the invention. The encoder 3 may be carried out in the functional blocks shown in either hardware, software or some combination of hardware and software as known in the art. If carried out in software, the functional blocks shown in FIG. 6 are embodied in program code stored on a computer readable medium for execution by a processor embodied in the functional block 3 of FIG. 3 for carrying out the functions of the blocks shown in more detail in FIG. 6. A software embodiment of the transmitter 4 of FIG. 8 may include a computer readable medium resident for instance in the transmitter 4 of FIG. 8 having program code stored thereon, wherein a processor may retrieve and execute the program code in order to carry out the functions shown in FIG. 6 and transmit an encoded video signal to the streaming server 5 via the transmitter 4 for storage in the memory 6 or for relay directly to the decoder 8 via the receiver 7.

A video frame to be encoded is first partitioned into blocks and each block is then encoded as either an SP-block, an SI-block, or an intra-block. Switch 690 is operated as appropriate to switch between the SI and SP encoding modes, i.e., the switch 690 is a construction used in the description of the invention, not necessarily a physical device. In SP-encoding mode switch 690 is operated to obtain a motion compensated prediction for the current block 670. Motion compensated prediction block 670 forms a prediction P(x,y) for the current block of the frame being encoded in a manner analogous to that used in motion compensated prediction known from prior art. More specifically, motion compensated prediction block 670 forms the prediction P(x,y) for the current block of the frame being encoded by determining a motion vector describing the relationship between the pixels in the current block and pixel values of a reconstructed reference frame held in frame memory 646.

In SI-encoding mode switch 690 is operated to obtain a prediction for the current block of the frame being coded from intra prediction block 680. Intra prediction block 680 forms the prediction P(x,y) for the current block of the frame being encoded in a manner analogous to that used in intra prediction known from prior art. More specifically, intra prediction block 680 forms the prediction P(x,y) for the current block of the frame being encoded using spatial prediction from already encoded neighbouring pixels within the frame being encoded.

In both SP- and SI-coding modes the prediction P(x,y) takes the form of a block of pixel values. A forward transform, for example a Discrete Cosine Transform (DCT), is applied to the predicted block of pixel values P(x,y) in block 660 and the resulting transform coefficients, referred to as $c_{pred}$, are subsequently quantised in quantisation block 650 to form quantised transform coefficients $I_{pred}$. Corresponding operations are also performed on the original image data. More specifically, the current block of pixel values of the original image being encoded is applied to transform block 610. Here, a forward transform (e.g., a DCT) is applied to the pixel values of the original image block to form transform coefficients $c_{orig}$. These transform coefficients are passed to quantisation block 620 where they are quantised to form quantised transform coefficients $I_{orig}$. The summing element 630 receives both sets of quantised transform coefficients $I_{pred}$ and $I_{orig}$ from the respective quantisation blocks 650 and 620 and generates a set of quantised prediction error coefficients $I_{err}$ according to the relationship:

$$I_{err} = I_{orig} - I_{pred}.$$

The quantised prediction error coefficients $I_{err}$ are passed to multiplexer 635. If the current block is encoded in SP-format/mode, multiplexer 635 also receives the motion vectors for the SP-coded block. If the current block is encoded in SI-format/mode, information concerning the intra prediction mode used to form the prediction for the SI-coded block in intra prediction block 680 is passed to the multiplexer. Advantageously, variable length coding is applied to the quantised prediction error coefficients $I_{err}$ and to the motion vector or intra prediction mode information in the multiplexer 635, a bit-stream is formed by multiplexing together the various forms of information and the bit-stream thus formed is transmitted to a corresponding decoder 8 (see FIG. 7).

The S-frame encoder 3 according to the invention also comprises local decoding functionality. The quantised prediction transform coefficients $I_{pred}$ formed in quantisation block 650 are supplied to the summing element 640 which also receives the quantisation error coefficients $I_{err}$. The summing element 640 recombines the quantised prediction transform coefficients $I_{pred}$ and the quantised prediction error coefficients $I_{err}$ to form a set of reconstructed quantised transform coefficients $I_{rec}$ according to the relationship:

$$I_{rec} = I_{pred} + I_{err}.$$

The reconstructed quantised transform coefficients are passed to inverse quantisation block 642 which inverse quantises the reconstructed quantised transform coefficients to form inverse quantised reconstructed transform coefficients $d_{rec}$. The inverse quantised reconstructed transform coefficients are further passed to inverse transform block 644 where they are subjected to e.g. an Inverse Discrete Cosine Transform (IDCT), or any other inverse transform corresponding to the transform performed in block 660. As a result, a block of reconstructed pixel values is formed for the image block in question and is stored in frame memory 646. As subsequent blocks of the frame being encoded in S-frame format undergo the previously described encoding and local decoding operations, a decoded version of the current frame is progressively assembled in the frame memory from where it can be accessed and used in intra prediction of subsequent blocks of the same frame or in inter (motion compensated) prediction of subsequent frames in the video sequence.

Figure 7:
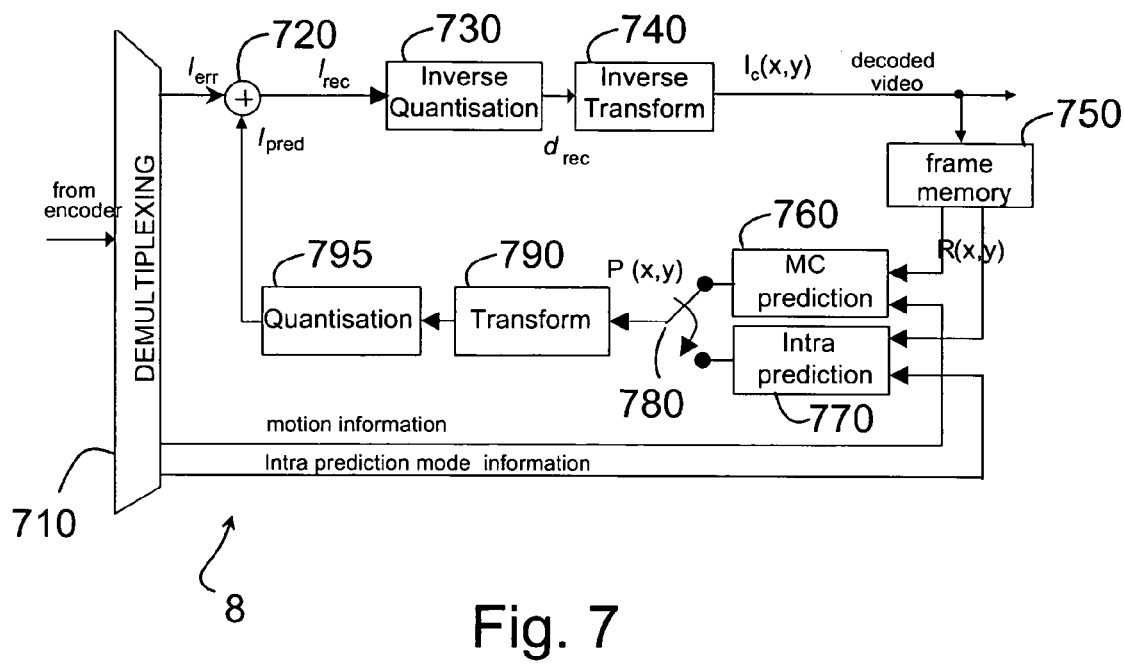
FIG. 7 is a block diagram of a decoder in accordance with an example embodiment of the invention.

Operation of a generic frame decoder according to an example embodiment of the invention will now be described with reference to FIG. 7.

The bit-stream generated by the frame encoder previously described in connection with FIG. 6 is received by decoder 8 and is demultiplexed into its constituent parts by demultiplexer 710. The decoder reconstructs a decoded version of the SP/SI-frame on a block-by-block basis. As previously described, an SP/SI-frame comprises SP-coded and SI-coded image blocks. For SP-format image blocks, the information in the received bit-stream comprises VLC encoded motion coefficient information and VLC encoded quantised prediction error coefficients $I_{err}$. For image blocks encoded in SI-format the information in the received bit-stream comprises VLC coded information relating to the intra prediction mode used to form the intra prediction for the SI-coded block together with VLC coded quantised prediction error coefficients $I_{err}$.

When decoding an SP-coded block, demultiplexer 710 first applies appropriate variable length decoding (VLD) to the received bit-stream to recover the motion vector information and quantised prediction error coefficients $I_{err}$. It then separates the motion vector information from the quantised prediction error coefficients $I_{err}$. The motion vector information is supplied to motion compensated prediction block 760 and the quantised prediction error coefficients recovered from the bit-stream are applied to one input of summing element 720. The motion vector information is used in motion compensated prediction block 760 together with pixel values of a previously reconstructed frame held in frame memory 750 to form a prediction P(x,y) in a manner analogous to that employed in the encoder 3.

When decoding an SI-coded block, demultiplexer 710 applies appropriate variable length decoding to the received intra prediction mode information and the quantised prediction error coefficients $I_{err}$. The intra prediction mode information is then separated from the quantised prediction error coefficients and supplied to intra prediction block 770. The quantised prediction error coefficients $I_{err}$ are supplied to one input of the summing element 720. The intra prediction mode information is used in intra prediction block 770 in conjunction with previously decoded pixel values of the current frame held in frame memory 750 to form a prediction P(x,y) for the current block being decoded. Again, the intra prediction process performed in decoder 8 is analogous to that performed in encoder 3 and previously described.

Once a prediction for the current block of the frame being decoded has been formed, switch 780 is operated so that the prediction P(x,y) which comprises predicted pixel values is supplied to transform block 790. Again, switch 780 is an abstract construction used in the description of the invention, not necessarily a physical device. In the case of an SP-coded block, switch 780 is operated to connect motion compensated prediction block 760 to transform block 790, while in the case of an SI-coded block it is operated to connect intra prediction block 770 to transform block 790.

In block 790, a forward transform, e.g., a Discrete Cosine Transform (DCT), is applied to the predicted block of pixel values P(x,y) and the resulting transform coefficients $c_{pred}$ are supplied to quantisation block 795 where they are quantised to form quantised transform coefficients $I_{pred}$. Quantised transform coefficients $I_{pred}$ are then supplied to the second input of summing element 720 where they are added to the prediction error coefficients $I_{err}$ to form reconstructed quantised transform coefficients $I_{rec}$ according to the relationship:

$$I_{rec}=I_{pred}+I_{err}.$$

The reconstructed quantised transform coefficients $I_{rec}$ are further supplied to inverse quantisation block 730 where they are inverse quantised to form inverse quantised reconstructed transform coefficients $d_{rec}$. The inverse quantised transform coefficients $d_{rec}$ are then passed to inverse transform block 740 where they are subjected to e.g. an Inverse Discrete Cosine Transform (IDCT), or any other inverse transform corresponding to the transform performed in block 790. In this way, a block of reconstructed pixel values is formed for the image block in question. The reconstructed pixel values are supplied to the video output and to frame memory 750. As subsequent blocks of the S-frame being decoded undergo the previously described decoding operations, a decoded version of the current frame is progressively assembled in frame memory 750 from where it can be accessed and used in the intra prediction of subsequent blocks of the same frame or in the inter (motion compensated) prediction of subsequent frames in the video sequence.

Having reviewed the structure and function of an S-frame encoder and decoder according to a first embodiment of the invention, it is now possible to understand how S-frames according to the invention make it possible to switch between bit-streams without mismatch errors such as those encountered in prior video encoding/decoding systems. Referring once more to the bit-stream switching example depicted in FIG. 5, switching from the first bit-stream 510 to the second bit-stream 520 occurs at the location of SP-frames 514 and 524 in the respective bit-streams. As previously noted, when switching is performed, a set of SP/SI-encoded frames are encoded and transmitted to provide fast refresh for the frames.

In addition to the transmission network, the request for the change of the bit stream transmission properties may also be originated by other parts of the transmission system. For example, the receiver may request the transmitting server to change the parameters for some reason. This request is delivered to the transmitting server e.g. via the transmission network.

Although H.264 is used as an example of a standard, embodiments of the present invention and any variations and modifications are deemed to be within the scope of the present invention.

Bit stream switching is not the only application in which the present invention can be applied. If one of the bit streams has a lower temporal resolution, e.g. 1 frame/sec, this bit stream can be used to provide fast-forward functionality. Specifically, decoding from the bit stream with a lower temporal resolution and then switching to the bit stream with a normal frame rate would provide such functionality. FIG. 8 depicts two bit streams the second of which comprises only S-frames predicted from each other at intervals greater than the frame repetition interval of the first bit-stream. Furthermore, "Fast Forward" can start and stop at any location in the bit-stream. In the following, some other applications of the present invention are described.

The bit stream-switching example discussed earlier considered bit streams belonging to the same sequence of images. However, this is not necessarily the case in all situations where bit stream switching is needed. Examples include: switching between bit streams arriving from different cameras capturing the same event but from different perspectives, or cameras placed around a building for surveillance; switching to local/national programming or insertion of commercials in a television broadcast, video bridging, etc. The general term for the process of concatenating encoded bit streams is splicing.

The invention described above provides an adaptive error resilience tool using SP/SI coding mode as well as a bitstream switching scheme. It is obvious that the present invention is not limited to the above described embodiments but it can be modified within the scope of the appended claims. For example, more than one group of blocks of the SP-frames can be replaced with SI-encoded macroblocks.

The invention claimed is:

1. A method for transmitting video information from an encoder in which at least one bitstream is formed from the video information comprising a set of frames, the frames comprising macroblocks, wherein the method comprises:
    forming a plurality of switching frames into said bitstream;
    arranging macroblocks of each switching frame of said plurality of switching frames into a first group of macroblocks and a second group of macroblocks;
    encoding each macroblock of said first group of macroblocks in said each switching frame by a first encoding method to provide a switching point for continuing transmission of video information with another bitstream formed from the video information; and
    encoding macroblocks of said second group of macroblocks in said each switching frame by a second encoding method wherein successive switching frames of said plurality of switching frames do not have corresponding groups of macroblocks encoded by said first encoding method.

2. The method according to claim 1 comprising encoding said first group of macroblocks by an intra encoding method.

3. The method according to claim 2 comprising encoding said second group of macroblocks by a predictive encoding method.

4. The method according to claim 1 comprising arranging said macroblocks of each switching frame of said plurality of switching frames into a set of slices, and arranging macroblocks of one slice of said set of the slices as said first group of macroblocks, and arranging macroblocks of other slices of said set of slices as said second group of macroblocks.

5. The method according to claim 1 comprising
    forming at least a first switching frame and a second switching frame into said bitstream, the switching frames being divided into mutually similar groups of macroblocks with each macroblock of the first switching frame having a spatially respective macroblock in said second switching frame;
    arranging macroblocks of said first switching frame into said first group and said second group of macroblocks;
    arranging macroblocks of said second switching frame into said first group and said second group of macroblocks so that the macroblocks of said first group of macroblocks of said second switching frame are spatially different macroblocks than the macroblocks of said first group of macroblocks of said first switching frame;
    encoding each macroblock of said first group of said first switching frame and said first group of macroblocks of said second switching frame by a first encoding method to provide a switching point for continuing the transmission of video information with said other bitstream formed from the video information; and encoding macroblocks of said second group of said first switching frame and said second group of macroblocks of said second switching frame by another encoding method.

6. The method according to claim 1 comprising forming an intra encoded frame from a frame of said set of frames, forming a switching predictive encoded frame from a frame following said intra encoded frame, and forming at least one switching frame from a frame following said switching predictive encoded frame.

7. An apparatus comprising:
an encoder configured for forming a plurality of switching frames into said bitstream; and
for arranging macroblocks of each switching frame of said plurality of switching frames into a first group of macroblocks and a second group of macroblocks, said encoder including:
a first prediction block configured for encoding each macroblock of said first group of macroblocks by a first encoding method to provide a switching point for continuing transmission of video information with another bitstream formed from the video information; and
a second prediction block configured for encoding macroblocks of said second group of macroblocks by a second encoding method
wherein successive switching frames of said plurality of switching frames do not have corresponding groups of macroblocks encoded by said first encoding method.

8. The apparatus according to claim 7, wherein said first encoding method is an intra encoding method.

9. The apparatus according to claim 8, wherein said second encoding method is a predictive encoding method.

10. The apparatus according to claim 7 comprising an arranger configured for arranging said macroblocks of each switching frame of said plurality of switching frames into a set of slices, and for arranging macroblocks of one slice of said set of the slices as said first group of macroblocks, and for arranging macroblocks of other slices of said set of slices as said second group of macroblocks.

11. The apparatus according to claim 7
said encoder configured for forming at least a first switching frame and a second switching frame into said bitstream, the first switching frame and the second switching frame being divided into mutually similar groups of macroblocks with each macroblock of the first switching frame having a spatially respective macroblock in said second switching frame;
an arranger configured for arranging macroblocks of said first switching frame into said first group of macroblocks and said second group of macroblocks and for arranging macroblocks of said second switching frame into said first group of macroblocks and said second group of macroblocks so that the macroblocks of said first group of macroblocks of said second switching frame are spatially different macroblocks than macroblocks of said first group of macroblocks of said first switching frame;
said first prediction block is configured for encoding each macroblock of said first group of macroblocks of said first switching frame and said first group of macroblocks of said second switching frame by a first encoding method to provide a switching point for continuing the transmission of video information with another bitstream formed from the video information; and said second prediction block is configured for encoding macroblocks of said second group of macroblocks of said first switching frame and said second group of macroblocks of said second switching frame by another encoding method.

12. The apparatus according to claim 7 configured for forming an intra encoded frame from a frame of said set of frames, for forming a switching predictive encoded frame from a frame following said intra encoded frame, and for forming at least one switching frame from a frame following said switching predictive encoded frame.

13. A transmission system for transmitting video information, the system comprising an encoder for encoding video information into at least one bitstream, a transmitter for transmitting the bit stream to a receiver, and a decoder for decoding the bitstream transmitted to the receiver, the video information comprising a set of frames comprising macroblocks, the encoder comprising:
means for forming a plurality of switching frames into said bitstream;
grouping means for arranging macroblocks of each switching frame of said plurality of switching frames into a first group and a second group of macroblocks;
first encoding means for encoding each macroblock of said first group of macroblocks by a first encoding method to provide a switching point for continuing transmission of video information with another bitstream formed from the video information; and
second encoding means for encoding macroblocks of said second group of macroblocks by another encoding method, wherein successive switching frames of said plurality of switching frames do not have corresponding groups of macroblocks encoded by said first encoding method;
the decoder comprising
first decoding means for decoding each macroblock of said first group of macroblocks by a first decoding method corresponding to the first encoding method; and
second decoding means for decoding each macroblock of said second group of macroblocks by a second decoding method corresponding to the second encoding method.

14. The system according to claim 13, wherein said first encoding method is an intra encoding method.

15. The system according to claim 14, wherein said second encoding method is a predictive encoding method.

16. The system according to claim 13 comprising means for arranging said macroblocks of said switching frames into a set of slices, and for arranging macroblocks of one slice of said set of the slices as said first group of macroblocks, and for arranging macroblocks of other slices of said set of the slices as said second group of macroblocks.

17. The system according to claim 13 comprising
means for forming at least a first switching frame and a second switching frame into said bitstream, the first switching frame and the second switching frame being divided into mutually similar groups of macroblocks with each macroblock of the first switching frame having a spatially respective macroblock in said second switching frame;
means for arranging macroblocks of said first switching frame into said first group of macroblocks and said second group of macroblocks and for arranging macroblocks of said second switching frame into said first group of macroblocks and said second group of macroblocks so that the macroblocks of said first group of macroblocks of said second switching frame are spatially different macroblocks than the macroblocks of said first group of macroblocks of said first switching frame;

means for encoding each macroblock of said first group of macroblocks of said first switching frame and said first group of macroblocks of said second switching frame by a first encoding method to provide a switching point for continuing transmission of video information with another bitstream formed from the video information; and means for encoding macroblocks of said second group of macroblocks of said first switching frame and said second group of macroblocks of said second switching frame by another encoding method.

18. The system according to claim 13 comprising means for forming an intra encoded frame from a frame of said set of frames, for forming a switching predictive encoded frame from a frame following said intra encoded frame, and for forming at least one switching frame from a frame following said switching predictive encoded frame.

19. A computer readable medium having a computer program comprising machine executable code stored thereon for execution by an encoder for transmission of video information, in which at least one bitstream is formed from the video information comprising a set of frames, the frames comprising macroblocks, wherein the computer program further comprises machine executable code for:

forming a plurality of switching frames into said bitstream;

arranging macroblocks of each switching frame of said plurality of switching frames into a first group of macroblocks and a second group of macroblocks;

encoding each macroblock of said first group of macroblocks in said each switching frame by a first encoding method to provide a switching point for continuing transmission of video information with another bitstream formed from the video information; and encoding macroblocks of said second group of macroblocks in said each switching frame by a second encoding method wherein successive switching frames of said plurality of switching frames do not have corresponding groups of macroblocks encoded by said first encoding method.

20. The computer readable medium according to claim 19 comprising machine executable code for encoding said first group of macroblocks by an intra encoding method.

21. The computer readable medium according to claim 20 comprising machine executable code for encoding said second group of macroblocks by a predictive encoding method.

22. The computer readable medium according to claim 19 comprising machine executable code for arranging said macroblocks of said switching frames into a set of slices, and arranging macroblocks of one slice of said set of the slices as said first group of macroblocks, and arranging macroblocks of other slices of said set of the slices as said second group of macroblocks.

23. The computer readable medium according to claim 19 comprising machine executable code for:

forming at least a first switching frame and a second switching frame into said bitstream, the switching frames being divided into mutually similar groups of macroblocks, each macroblock of the first switching frame having a spatially respective macroblock in said second switching frame;

arranging macroblocks of said first switching frame into a first group of macroblocks and a second group of macroblocks;

arranging macroblocks of said second switching frame into said first group of macroblocks and second group of macroblocks so that the macroblocks of said first group of macroblocks of said second switching frame are spatially different macroblocks than the macroblocks of said first group of macroblocks of said first switching frame;

encoding each macroblock of said first group of macroblocks of both said first switching frame and said second switching frame by said first encoding method to provide a switching point for continuing transmission of video information with another bitstream formed from the video information; and encoding macroblocks of said second group of macroblocks of both said first switching frame and said second switching frame by said second encoding method.

24. The computer readable medium according to claim 19 comprising machine executable code for forming an intra encoded frame from a frame of said set of frames, forming a switching predictive encoded frame from a frame following said intra encoded frame, and forming at least one switching frame from a frame following said switching predictive encoded frame.

25. A method for reducing effects of transmission errors in transmission of video information from an encoder in which at least one bitstream is formed from the video information comprising a set of frames, the frames comprising macroblocks, wherein the method comprises:

forming a plurality of switching predictive encoded frames into said bitstream by predictively encoding the macroblocks of each switching predictive encoded frame;

replacing part of the switching predictive encoded macroblocks of said each switching predictive encoded with macroblocks encoded by an intra encoding method; and transmitting a plurality of frames containing both predictively encoded macroblocks and intra encoded macroblocks wherein successive frames of said plurality of frames containing both predictively encoded macroblocks and intra encoded macroblocks do not have corresponding groups of macroblocks encoded by said first encoding method.

26. A computer readable medium comprising machine executable code for execution by an encoder in reducing effects of transmission errors in transmission of video information, in which at least one bitstream is formed from the video information comprising a set of frames, the frames comprising macroblocks, wherein the computer readable medium further comprises machine executable code for:

forming a plurality of switching predictive encoded frames into said bitstream by predictively encoding the macroblocks of each switching predictive encoded frame;

replacing part of the switching predictive encoded macroblocks of said each switching predictive encoded with macroblocks encoded by an intra encoding method; and transmitting a plurality of frames containing both predictively encoded macroblocks and intra encoded macroblocks wherein successive frames of said plurality of frames containing both predictively encoded macroblocks and intra encoded macroblocks do not have corresponding groups of macroblocks encoded by said first encoding method.

27. A computer readable medium having video information stored thereon for use by a transmitter in retrieving the video information from the computer readable medium for transmitting the video information on a signal in at least one bitstream comprising the video information in a set of frames, the frames comprising macroblocks, wherein the signal comprises:

a plurality of switching frames of said plurality of switching frames;

macroblocks of each switching frame of said plurality of switching frames being arranged into a first group of macroblocks and a second group of macroblocks;

each macroblock of said first group of macroblocks in said each switching frame being encoded by a first encoding method to provide a switching point for continuing transmission of video information with another bitstream formed from the video information; and macroblocks of said second group of macroblocks of said each switching frame being encoded by a second encoding method wherein successive switching frames of said plurality of switching frames do not have corresponding groups of macroblocks encoded by said first encoding method.

28. The computer readable medium according to claim 27, wherein said first group of macroblocks are encoded by an intra encoding method.

29. The computer readable medium according to claim 28, wherein said second group of macroblocks are encoded by a predictive encoding method.

30. The computer readable medium according to claim 27, wherein said macroblocks of said switching frames are arranged into a set of slices, and macroblocks of one slice of said set of the slices are arranged as said first group of macroblocks, and macroblocks of other slices of said set of the slices are arranged as said second group of macroblocks.

31. The computer readable medium according to claim 27 comprising at least a first switching frame and a second switching frame formed into said bitstream, the switching frames being divided into mutually similar groups of macroblocks, each macroblock of the first switching frame having a spatially respective macroblock in said second switching frame;

macroblocks of said first switching frame are arranged into a first group of macroblocks and a second group of macroblocks;

macroblocks of said second switching frame are arranged into said first group of macroblocks and said second group of macroblocks so that the macroblocks of said first group of macroblocks of said second switching frame are spatially different macroblocks than the macroblocks of said first group of macroblocks of said first switching frame;

each macroblock of said first group of macroblocks of both said first switching frame and said second switching frame are encoded by said first encoding method to provide a switching point for continuing transmission of video information with another bitstream formed from the video information; and macroblocks of said second group of macroblocks are encoded of both said first switching frame and said second switching frame by said second encoding method.

32. The computer readable medium according to claim 27, wherein an intra encoded frame is formed from a frame of said set of frames, and a switching predictive encoded frame is formed from a frame following said intra encoded frame, and at least one switching frame is formed from a frame following said switching predictive encoded frame.

33. An apparatus for encoding video information into at least one bitstream, the video information comprising a set of frames comprising macroblocks, the apparatus comprising:

means for forming a plurality of switching frames into said bitstream;

grouping means for arranging macroblocks of each switching frame of said plurality of switching frames into a first group and a second group of macroblocks;

first encoding means for encoding each macroblock of said first group of macroblocks in said each switching frame by a first encoding method to provide a switching point for continuing transmission of video information with another bitstream formed from the video information; and second encoding means for encoding macroblocks of said second group of macroblocks in said each switching frame by a second encoding method wherein successive switching frames of said plurality of switching frames do not have corresponding groups of macroblocks encoded by said first encoding method.

34. An apparatus comprising:

an input for inputting successive frames of video information in a received signal having information on an encoding method of a group of macroblocks of each frame;

first prediction block configured for decoding each macroblock of said group of macroblocks by a first decoding method corresponding to a first encoding method when said information indicates that said group of macroblocks have been encoded by the first decoding method; and second prediction block configured for decoding each macroblock of said group of macroblocks by a second decoding method corresponding to a second encoding method when said information indicates that said group of macroblocks have been encoded by the second decoding method wherein said successive frames do not have corresponding groups of macroblocks encoded by said first encoding method.

* * * * *

UNITED STATES PATENT AND TRADEMARK OFFICE
CERTIFICATE OF CORRECTION

PATENT NO. : 7,693,220 B2
APPLICATION NO. : 10/785426
DATED : April 6, 2010
INVENTOR(S) : Ru-Shang Wang et al.

It is certified that error appears in the above-identified patent and that said Letters Patent is hereby corrected as shown below:

In column 17, line 28 (claim 7, line 15) insert --,-- after "method".

Signed and Sealed this

Third Day of August, 2010

David J. Kappos
*Director of the United States Patent and Trademark Office*